(12) United States Patent
Kato et al.

(10) Patent No.: US 6,681,166 B2
(45) Date of Patent: Jan. 20, 2004

(54) STEER-BY-WIRE DRIVE CONTROL SYSTEM WITH OPERATING ELEMENT HOME POSITION UPDATING FUNCTION

(75) Inventors: Hironori Kato, Miyagi-ken (JP); Yoshio Sanpei, Miyagi-ken (JP); Noriyuki Fukushima, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/191,130

(22) Filed: Jul. 9, 2002

(65) Prior Publication Data
US 2003/0014169 A1 Jan. 16, 2003

(30) Foreign Application Priority Data
Jul. 11, 2001 (JP) ........................................ 2001-210928

(51) Int. Cl.[7] .............................. B62D 5/04; B62D 6/00
(52) U.S. Cl. ............................ 701/41; 701/42; 180/402
(58) Field of Search ..................... 701/41, 42; 180/402, 180/443

(56) References Cited
U.S. PATENT DOCUMENTS 6,097,286 A    8/2000  Discenzo
6,535,806 B2 * 3/2003  Millsap et al. ............... 701/42
6,554,095 B2 * 4/2003  Zheng et al. ............... 180/402
6,575,263 B2 * 6/2003  Hjelsand et al. ............ 180/402
6,588,540 B2 * 7/2003  Graber et al. ............... 180/402

FOREIGN PATENT DOCUMENTS

EP    1 211 161    6/2002

* cited by examiner

Primary Examiner—Michael J. Zanelli
(74) Attorney, Agent, or Firm—Brinks Hofer Gilson & Lione

(57) ABSTRACT

A controller comprises: a home position memory which memorizes the home position of a steering wheel for force feedback control; a frequency calculating section which calculates a frequency of input of a steering signal; and a home position rewriting section which memorizes an operating angle of the steering wheel where the steering signal is most frequently inputted, as a new home position of the steering wheel in the home position memory. According to a rewriting signal outputted from the home position rewriting section, the home position memorized in the home position rewriting section is repeatedly rewritten.

4 Claims, 6 Drawing Sheets

STEER-BY-WIRE DRIVE CONTROL SYSTEM WITH OPERATING ELEMENT HOME POSITION UPDATING FUNCTION

BACKGROUND OF THE INVENTION

1. Field of the Invention

The present invention relates to a steer-by-wire drive control system such as a steer-by-wire steering device built in a vehicle and particularly to means for updating the home position of an operating element.

2. Description of the Prior Art

Referring to FIGS. 5 and 6, an example of a conventional steer-by-wire steering device will be described below. FIG. 5 shows the structure of a conventional steer-by-wire steering device and FIG. 6 is a graph showing the relation between an external force applied to the tire and a reactive force applied to the steering wheel.

As shown in FIG. 5, this steer-by-wire steering device comprises: a steering wheel 1 as an operating element; an operating angle sensor 2 which senses the operating condition of the steering wheel 1; an operating element actuator 3 as a force feedback actuator which applies an external force for force feedback to the steering wheel 1; a tire reactive force sensor 5 for sensing the reactive force from a road surface which acts on a vehicle's steering system 4 as an operated device; a steering actuator 6 as an actuator for driving the operated device which applies an external force for steering to the steering system 4; a first controller 7 (CPU) which receives output signals a and f from the operating angle sensor 2 and the steering system 4 respectively and controls the operating element actuator 3; and a second controller 9 which receives output from the tire reactive force sensor 5 and a signal b for information on the operating condition of the steering wheel 1 and controls operation of the steering actuator 6.

The steering wheel 1 is designed to be able to be turned clockwise and counterclockwise. The steering system 4 of the vehicle is designed to be able to move the tires 8 to the right and the left by the same amount from the home position of the system. The home position of the steering wheel 1 for force feedback control is adjusted with reference to the home position of the steering system 4 of the vehicle so that the vehicle can go straight ahead on a flat road surface.

When the driver turns the steering wheel 1 clockwise or counterclockwise while driving, the operating direction and angle of the steering wheel are detected by the operating angle sensor 2, which in turn outputs a steering signal a depending on the operating direction and angle of the steering wheel 1. The first controller 7 receives this steering signal a and generates and outputs an information signal b for indicating the operating condition of the steering wheel 1, which depends on the signal a. This information signal b drives the steering actuator 6 to laterally move the vehicle's steering system 4 in the direction corresponding to the operating direction of the steering wheel 1, by the angle of rotation equivalent to the operating angle of the steering wheel 1, so that the vehicle curves to the right or left.

As the vehicle curves, a reactive force (cornering force) from the road surface which depends on the vehicle's speed, steering angle and other factors acts on the tires 8 and the tire reactive force sensor 5 outputs a tire reactive force detection signal c which depends on the reactive force. The second controller 9 receives the tire reactive force detection signal c and outputs a control signal f. The first controller 7 receives the control signal f and generates and outputs a drive signal d for the operating element actuator 3 which depends on the signal f. This drive signal d drives the operating element actuator 3 and, as shown in FIG. 6, an external force proportional to the reactive force which acts on the tires 8 is given to the steering wheel 1. In this way, the driver can get the same kind of driving feeling as when he or she drives a vehicle with a mechanical steering device.

However, over time, the home position of the steering wheel 1 for force feedback control may become out of alignment with the home position of the steering system 4 built in the vehicle because of irregular tire wear or irregular wear of a steering system mechanical component.

If, for some reason, the home position of the steering wheel 1 for force feedback control deviates from the home position of the steering system 4 built in the vehicle, when the steering wheel 1 is held in its home position, the vehicle would curve in the direction opposite to the deviation; on the other hand, when the steering wheel 1 is operated in a manner to suit the running condition of the vehicle, the steering wheel 1 should be off its home position, or on the deviation side, the driving feeling would worsen and also, even if the steering wheel 1 is turned by the same angle of rotation clockwise and counterclockwise, the vehicle would not curve by the same angle of rotation clockwise and counterclockwise, impairing the vehicle's driving safety and operability.

The conventional type of steer-by-wire steering device has no means to automatically compensate for a discrepancy between the home position of the steering wheel 1 for force feedback control and the home position of the steering system 4 and, therefore, cannot prevent the above-mentioned inconvenience.

SUMMARY OF THE INVENTION

The present invention has been made to solve the above problem inherent to the prior art and provides a steer-by-wire drive control system with a high operability and a high durability which automatically compensates for a discrepancy between the home position of the steering wheel for force feedback control and the home position of the steering system built in the vehicle.

In order to solve the above problem, according to one aspect of the present invention, a steer-by-wire drive control system which comprises: an operating element which can be operated in a first direction and a second direction; a sensor which detects an operating condition of the operating element; an operating element actuator which applies an external force to the operating element; and a controller which controls operation of the operating element actuator with reference to a memorized home position, wherein the controller calculates frequencies of a signal outputted from the sensor and updates the operating element's home position memorized in the controller to the operating element's position where the signal is most frequently outputted, as a new home position of the operating element.

Taking a steer-by-wire steering device as an example, the steering wheel is operated with reference to the home position of the steering system (operated device) regardless of the home position of the steering wheel (operating element) for force feedback control in order to let the vehicle run along a desired course. In other words, if, for some reason, there is a discrepancy between the steering wheel's home position for force feedback control and the steering system's home position, in his/her attempt to let the vehicle run along a desired course, the driver controls the steering wheel with reference to a position deviated from its home position instead of with reference to the home position of the steering wheel. In addition, during driving, in which the steering wheel is repeatedly turned clockwise and counterclockwise, the steering wheel operating angle corresponding to the steering system's home position is most frequently used and the larger the steering wheel operating angle is, the less frequently it is used.

Thus, since the controller repeatedly calculates frequencies of signals outputted from the steering wheel operating angle sensor to get information on the current actual home position of the steering wheel, the steering wheel operating angle (position) where the signal is most frequently outputted is re-memorized in the controller as a new home position of the steering wheel to make the steering wheel's home position for force feedback control agree with the steering system's home position. Once both the home positions have agreed, operation of the operating element actuator (force feedback actuator) can be controlled with reference to the new home position. As a consequence, it is possible to prevent worsening of the vehicle's driving feeling or deterioration in the vehicle's driving safety due to a discrepancy between the steering wheel's home position and the steering system's home position.

In order to solve the above problem, according to another aspect of the present invention, the controller updates the operating element's home position memorized in the controller when a difference between the operating element's home position memorized in the controller and the calculated new home position reaches a prescribed value.

An advantage of this arrangement is that the operability and driving safety are improved because the operating element's home position is updated before the driver begins to feel deterioration in the vehicle's operability.

In order to solve the above problem, according to a further aspect of the present invention, a steer-by-wire drive control system comprises: an operating element which can be operated in a first direction and a second direction; a first sensor which detects an operating condition of the operating element; an operating element actuator which applies an external force to the operating element; an operated device which is operated in a first direction and a second direction from a home position by controlling the operating element; a second sensor which detects a condition of the operated device; an operated device actuator which drives the operated device; a first controller which controls operation of the operating element actuator with reference to a memorized home position of the operating element; and a second controller which receives information on the operating condition of the operating element from the first controller and controls operation of the operated device actuator, wherein the first controller receives a signal outputted from the second sensor to detect a home position of the operated device and updates the operating element's home position memorized in the first controller with reference to the home position of the operated device.

An advantage of this arrangement is explained next taking a steer-by-wire steering device as an example. As stated earlier, while a vehicle is running, a reactive force from the road surface, which depends on the vehicle's speed, steering angle and other factors, acts on the tires. The reactive force which acts on each tire is the smallest when the vehicle is running straight ahead, namely the vehicle's steering system (operated device) is in its home position, and increases as the steering angle of the steering system increases. Therefore, the controller can calculate the home position of the steering system from signals which it receives from the tire reactive force sensor (second sensor).

As stated earlier, while the vehicle is running, the steering wheel is operated with reference to the home position of the steering system (operated device) regardless of the home position of the steering wheel (operating element) for force feedback control. The steering wheel operating angle (position) corresponding to the steering system's home position is re-memorized in the controller as a new home position of the steering wheel so that the steering wheel's home position agrees with the steering system's home position. As a consequence, worsening of the vehicle's driving feeling or deterioration in its driving safety due to a discrepancy between the steering wheel's home position and the steering system's home position can be prevented.

In order to solve the above problem, according to a further aspect of the present invention, the first controller updates the operating element's home position memorized in the first controller when a difference between the operating element's home position memorized in the first controller and the operated device's home position reaches a prescribed value.

An advantage of this arrangement is that the operability and driving safety are improved because the operating element's home position is updated before the driver begins to feel deterioration in the vehicle's operability.

BRIEF DESCRIPTION OF THE DRAWINGS

The invention will be more particularly described with reference to the accompanying drawings, in which.

DETAILED DESCRIPTION OF THE PREFERRED EMBODIMENTS

Figure 1:
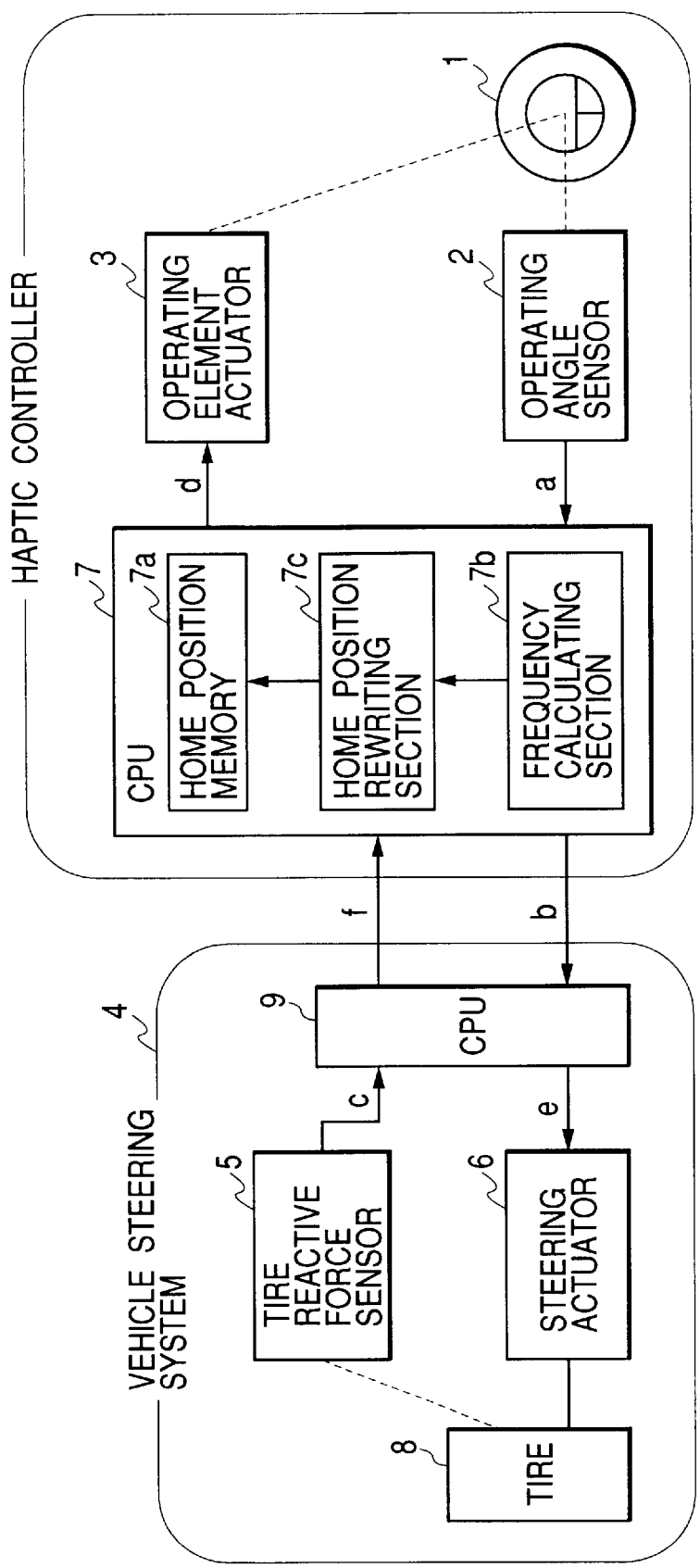
FIG. 1 shows the structure of a steer-by-wire drive control system according to a first embodiment of the present invention.

Next, referring to FIGS. 1 and 2, a steer-by-wire drive control system according to a first embodiment of the present invention will be described below, taking a steer-by-wire steering device as an example. FIG. 1 shows the structure of a steer-by-wire drive control system according to the first embodiment of the present invention, and FIG. 2 is a graph showing the relation between the steering wheel operating angle and the steering wheel operation frequency.

Figure 5:
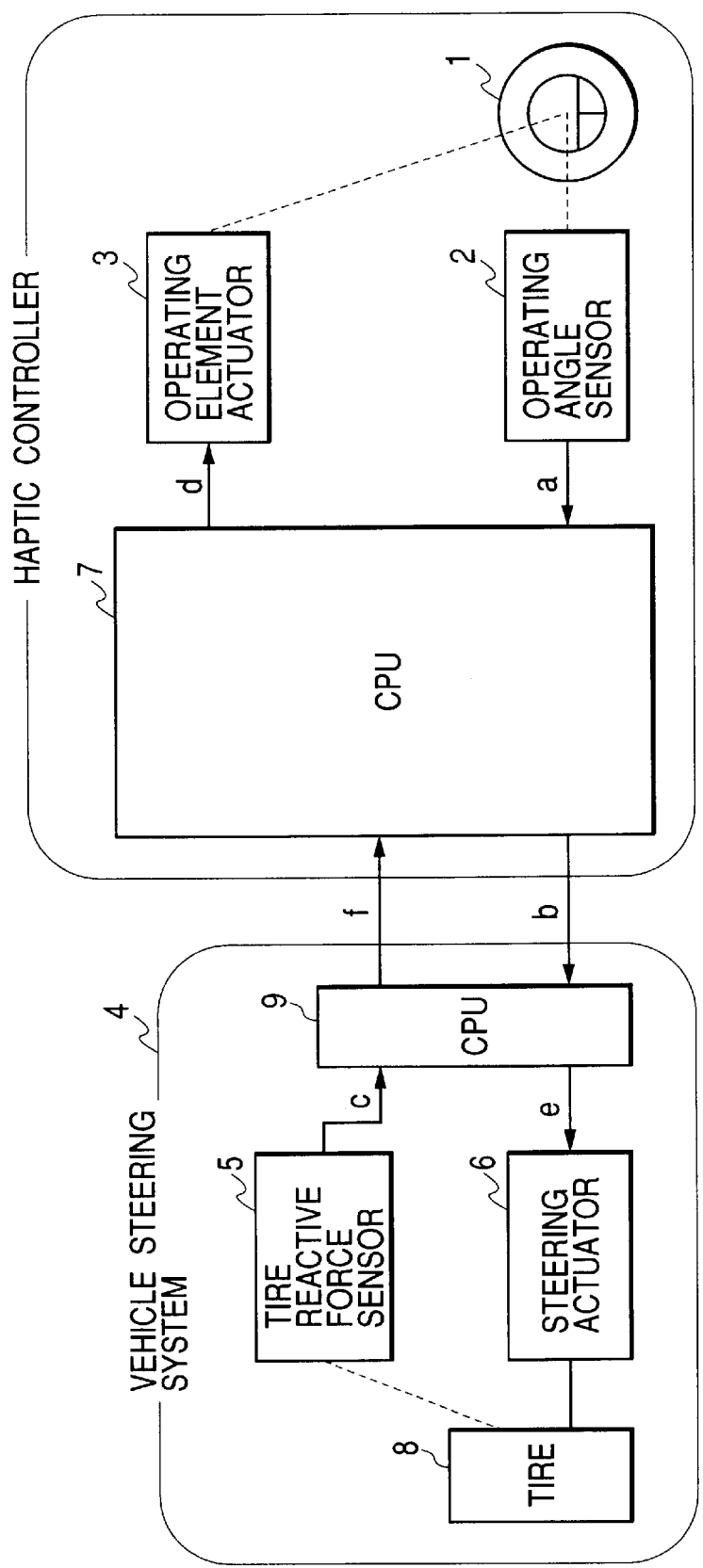
FIG. 5 shows the structure of a conventional steer-by-wire drive control system.
Figure 6:
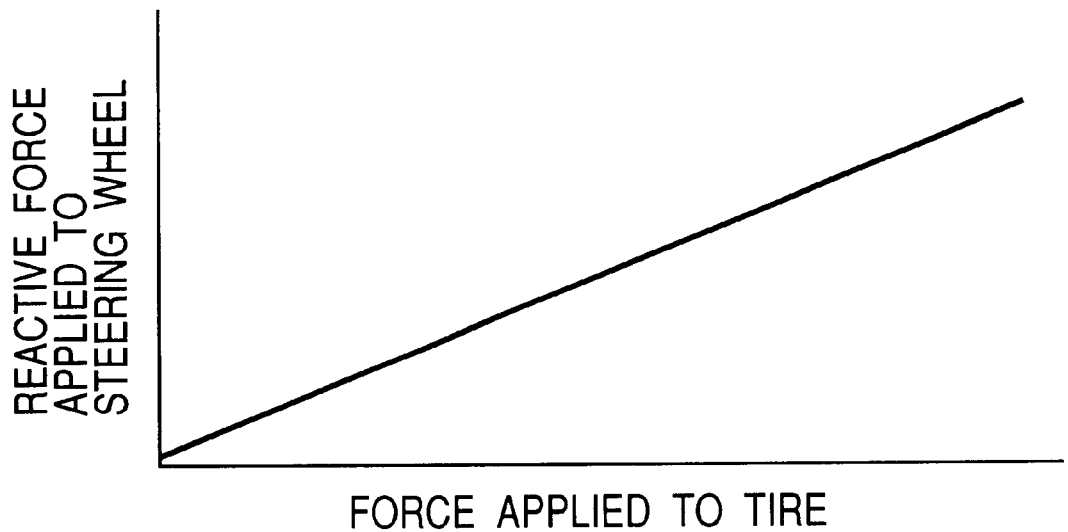
FIG. 6 is a graph showing the relation between the external force applied to the steering wheel and the external force applied to the vehicle's tire in the conventional steer-by-wire drive control system.

As shown in FIG. 1, the steer-by-wire steering device according to this embodiment has the same basic structure as the conventional steer-by-wire steering device as shown in FIG. 5. This steer-by-wire steering device comprises: a steering wheel 1 (operating element); an operating angle sensor 2 which senses the operating condition of the steering wheel 1; an operating element actuator 3 (force feedback actuator) which applies an external force for force feedback control to the steering wheel 1; a tire reactive force sensor 5 which senses the reactive force from the road surface which acts on the vehicle's steering system 4 (operated device); a steering actuator 6 (actuator for driving the operated device) which applies an external force for steering to the steering system 4; a first controller 7 (CPU) which receives an output signal a from the operating angle sensor 2 and a control signal f depending on the condition of the steering system 4 and outputs a drive signal d for the operating element actuator 3; and a second controller 9 which receives a signal b for information on the operating condition of the steering wheel 1 from the first controller 7, receives a signal c from the tire reactive force sensor 5 and outputs a drive signal e for the steering actuator 6 and outputs the control signal f for the first controller 7.

The first controller 7 comprises: a home position memory 7a which memorizes the home position of the steering wheel 1 for force feedback control; a frequency calculating section 7b which receives a steering signal a from the operating angle sensor 2 and calculates the operating angle of the steering wheel 1 with reference to the home position information memorized in the home position memory 7a and the frequency of input of the steering signal a for each operating angle; and a home position rewriting section 7c which memorizes the operating angle of the steering wheel 1 corresponding to the highest frequency of input of the steering signal a, as a new home position of the steering wheel 1 in the home position memory 7a. According to a rewriting signal outputted from the home position rewriting section 7c, the home position memorized in the home position memory 7a is repeatedly rewritten. This home position rewriting operation may be done at regular intervals or at irregular intervals. If the rewriting operation is to be done at irregular intervals, for example, rewriting may take place each time the difference between the home position memorized in the home position memory 7a and the current home position calculated by the frequency calculating section 7b reaches a predetermined value. The initially memorized home position is determined with reference to the home position of the vehicle's steering system 4 so that the vehicle runs straight on a flat road surface.

Figure 2:
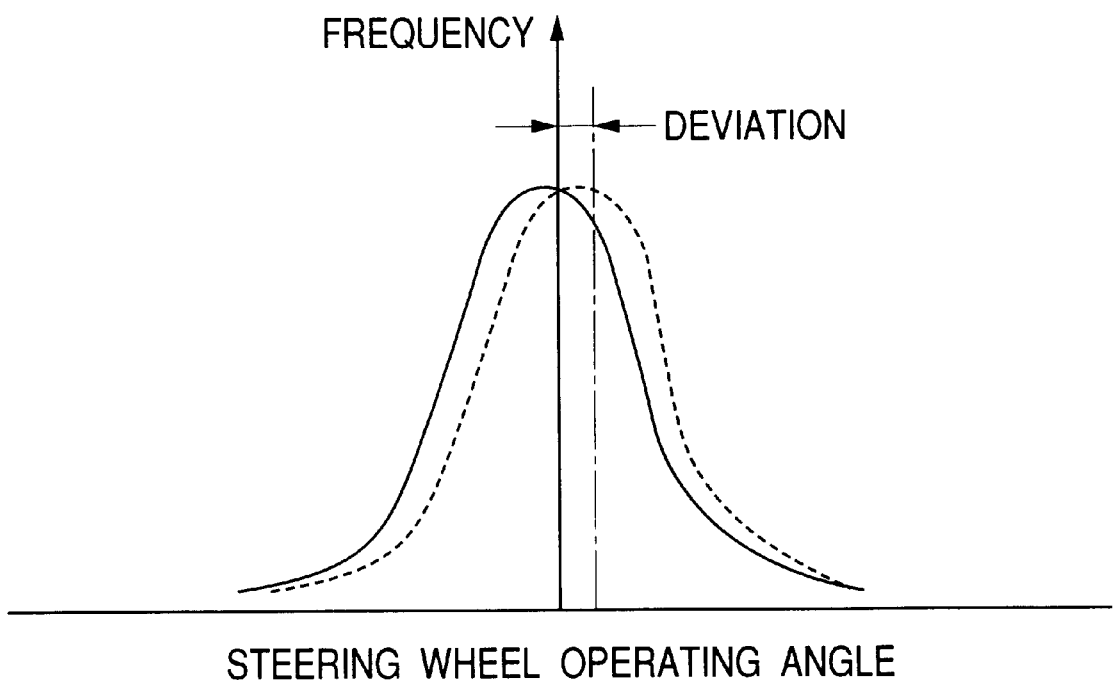
FIG. 2 is a graph showing the relation between the steering wheel operating angle and the steering wheel operation frequency.

As shown in FIG. 2, because the steering wheel 1 is turned repeatedly clockwise or counterclockwise during driving, the operating angle of the steering wheel 1 corresponding to the home position of the steering system 4 is most frequently used; and the larger the steering wheel's 1 operating angle is, the less frequently it is used. When the home position of the steering wheel 1 for force feedback control agrees with the home position of the steering system 4, the frequency of input of the steering signal a is the highest at an operating angle of 0 degree, as indicated by the solid line in FIG. 2. On the other hand, if, for some reason, there is a discrepancy between the home position of the steering wheel 1 memorized in the home position memory 7a and the home position of the steering system 4, the driver controls the steering wheel 1 with reference to the home position of the steering system 4 in his/her attempt to let the vehicle run along the desired course. In this case, the most frequently used operating angle of the steering wheel 1 deviates from the home position of the steering wheel 1 by the angle of rotation corresponding to the difference between the home position of the steering wheel 1 and that of the steering system 4, as indicated by the dotted line in FIG. 2.

Thus, as the controller 7 receives a steering signal a outputted from the operating angle sensor 2 to get information on the current actual home position of the steering wheel 1, the home position memorized in the home position memory 7a is rewritten to the current actual home position by the home position rewriting section 7c to compensate for a discrepancy between the home position of the steering wheel 1 for force feedback control and the home position of the steering system 4. As a result, the steering signal a outputted from the operating angle sensor 2 matches the actual operating direction and angle of the steering wheel 1, and also signals b and d, which are generated based on the steering signal a, match the actual operating direction and angle of the steering wheel 1. This means that the operating element actuator 3 and the steering actuator 6 are driven in accordance with the actual operating direction and angle of the steering wheel 1; as a consequence, worsening of the vehicle's driving feeling or deterioration in the vehicle's driving safety due to a discrepancy between the home position of the steering wheel 1 for force feedback control and the home position of the steering system 4 can be prevented.

Figure 3:
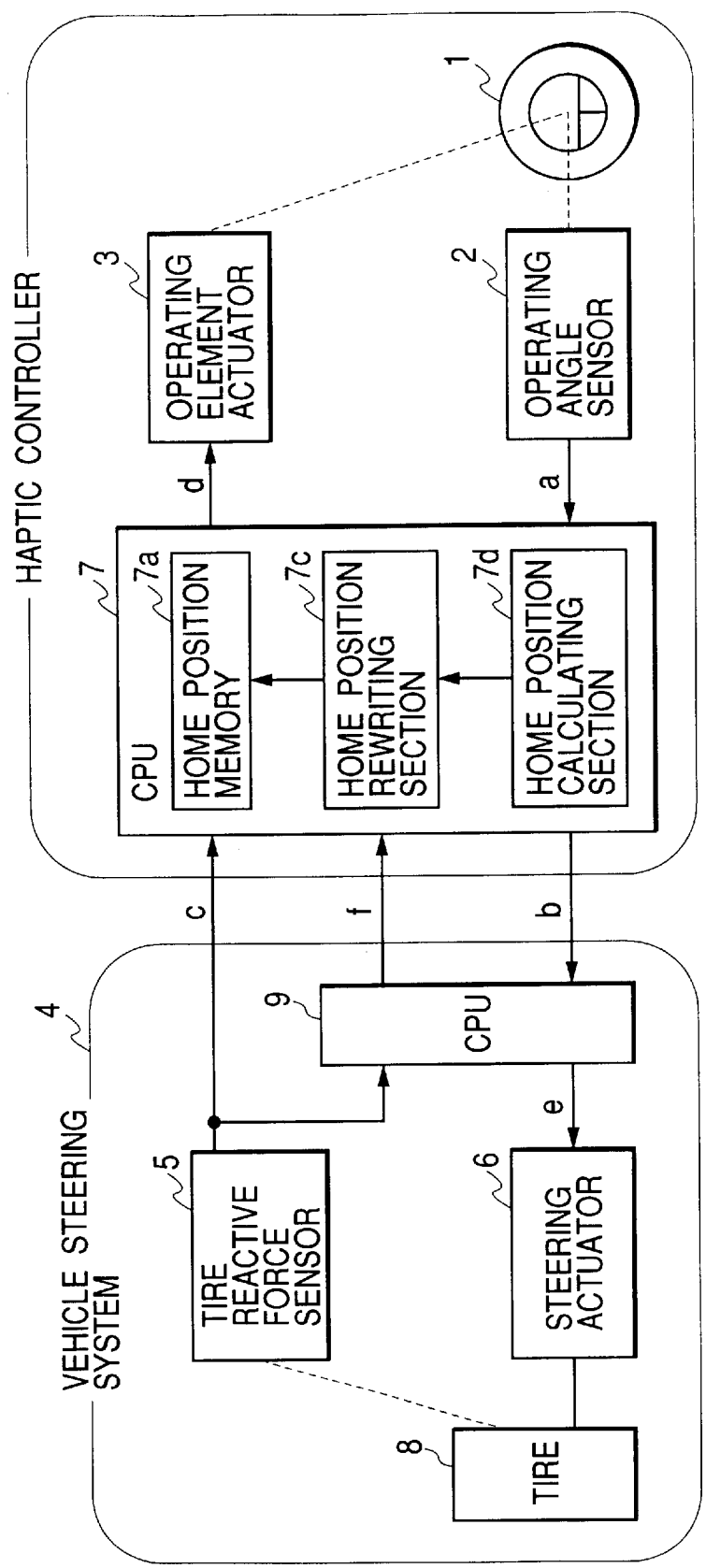
FIG. 3 shows the structure of a steer-by-wire drive control system according to a second embodiment of the present invention.
Figure 4:
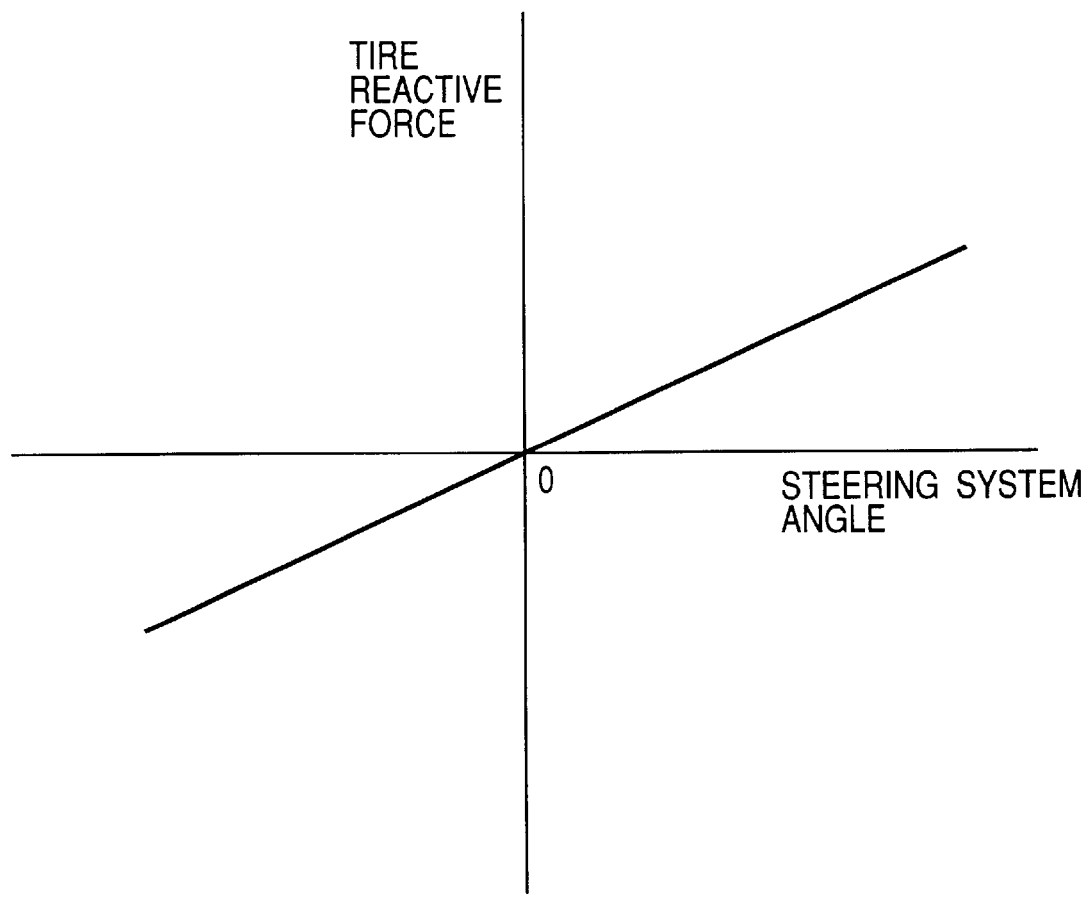
FIG. 4 is a graph showing the relation between the steering angle of the steering system built in the vehicle and the tire reactive force.

Next, a steer-by-wire drive control system according to a second embodiment of the present invention will be described below referring to FIGS. 3 and 4. FIG. 3 shows the structure of a steer-by-wire steering device according to this embodiment of the present invention. FIG. 4 is a graph showing the relation between the steering angle of the steering system built in the vehicle and the tire reactive force.

As illustrated in FIG. 3, the steer-by-wire steering device according to this embodiment has the same basic structure as the steer-by-wire steering device according to the first embodiment shown in FIG. 1. This steer-by-wire steering device comprises: a steering wheel 1 (operating element); an operating angle sensor (first sensor) 2 which senses the operating condition of the steering wheel 1; an operating element actuator (force feedback actuator) 3 which applies an external force for force feedback control to the steering wheel 1; a tire reactive force sensor (second sensor) 5 which senses the reactive force from the road surface which acts on the vehicle's steering system (operated device) 4; a steering actuator (actuator for driving the operated device) 6 which drives the steering system 4; a first controller 7 which receives an output signal a from the operating angle sensor 2 and operating element actuator 3; and a second controller 9 which receives a signal b for a control signal f from the steering system 4 and outputs a signal d for driving the information on the operating condition of the steering wheel 1 from the first controller 7, receives a signal c from the tire reactive force sensor 5, and outputs a drive signal e for the steering actuator 6 and outputs the control signal f for the first controller 7.

The first controller 7 comprises: a home position memory 7a which memorizes the home position of the steering wheel 1 for force feedback control; a home position calculating section 7d which receives a tire reactive force detection signal c from the tire reactive force sensor (second sensor) 5 to calculate the home position of the steering system (operated device) 4 of the vehicle; and a home position rewriting section 7c which memorizes the home position calculated by the home position calculating section 7d as a new home position of the steering wheel 1 for force feedback control in the home position memory 7a. According to a rewriting signal from the home position rewriting section 7c, the home position memorized in the home position memory 7a is repeatedly rewritten. This home position rewriting operation may be done at regular intervals or at odd intervals. The initially memorized home position is determined with reference to the home position of the vehicle's steering system 4 so that the vehicle runs straight on a flat road surface.

As illustrated in FIG. 4, when the vehicle speed is constant, the reactive force from the road surface which acts on the tires during driving is zero while the vehicle is running straight, namely when the vehicle's steering system 4 is in its home position, and increases as the turning angle of the steering wheel 4 increases.

Thus, as the controller 7 receives a tire reactive force detection signal c from the tire reactive force sensor (second sensor) 5 to get information on the current actual home position of the steering wheel 4, the home position memorized in the home position memory 7a is rewritten to the current actual home position by the home position rewriting section 7c to compensate for a discrepancy between the home position of the steering wheel 1 for force feedback control and the home position of the steering system 4. As a result, the steering signal a outputted from the operating angle sensor 2 matches the actual operating direction and angle of the steering wheel 1, and also signals b and d, which are generated based on the steering signal a, match the actual operating direction and angle of the steering wheel 1. This means that the operating element actuator 3 and the steering actuator 6 are driven in accordance with the actual operating direction and angle of the steering wheel 1; as a consequence, worsening of the vehicle's driving feeling or deterioration in the vehicle's driving safety due to a discrepancy between the home position of the steering wheel 1 and the home position of the steering system 4 can be prevented.

Although the above embodiments concern steer-by-wire steering devices as examples, a steer-by-wire drive control system according to the present invention may be embodied not only for a steering device but also for any device incorporating an operating element which can be operated in a first direction and a second direction and an operated device which can be operated in a first direction and a second direction from its home position.

Also, in the above embodiments, the steering wheel 1 is used as an operating element; however, the invention may be embodied in the form of a steer-by-wire drive control system which uses a laterally movable lever as an operating element In addition, it is obvious that when both the above-described techniques employed in the above embodiments are applied at the same time, the operability and safety of a steer-by-wire drive control system can be further improved.

As discussed so far, according to the present invention, the frequencies of signal outputs from a sensor which detects the operating condition (position) of an operating element are repeatedly calculated by a controller and the home position of the operating element is updated by memorizing the operating element's position where the signal is most frequently outputted as a new home position of the operating element, so that a discrepancy between the home position of the operating element and the home position of the operated device can be automatically eliminated and the operability and safety of the steer-by-wire drive control system can be improved.

Furthermore, according to the present invention, a controller receives a signal from a sensor which detects the condition of the operated device to calculate the home position of the operated device, and if there is a discrepancy between the home position of the operating element for force feedback control and the home position of the operated device, the home position of the operating element is adjusted with reference to the home position of the operated device so that the discrepancy between the home position of the operating element and the home position of the operated device can be automatically eliminated and the operability and safety of the steer-by-wire drive control system can be improved.

What is claimed is:

1. A steer-by-wire drive control system comprising: an operating element which can be operated in a first direction and a second direction; a sensor which detects an operating condition of the operating element; an operating element actuator which applies an external force to the operating element; and a controller which controls operation of the operating element actuator with reference to a memorized home position, wherein the controller calculates frequencies of a signal outputted from the sensor and updates the operating element's home position memorized in the controller to the operating element's position where the signal is most frequently outputted as a new home position of the operating element.

2. A steer-by-wire drive control system comprising: an operating element which can be operated in a first direction and a second direction; a first sensor which detects an operating condition of the operating element; an operating element actuator which applies an external force to the operating element; an operated device which is operated in a third direction and a fourth direction from a home position by controlling the operating element; a second sensor which detects a condition of the operated device; an operated device actuator which drives the operated device; a first controller which controls operation of the operating element actuator with reference to a memorized home position of the operating element; and a second controller which receives information on the operating condition of the operating element from the first controller and controls operation of the operated device actuator, wherein the first controller receives a signal outputted from the second sensor to detect the home position of the operated device and updates the operating element's home position memorized in the first controller with reference to the home position of the operated device.

3. The steer-by-wire drive control system according to claim 1, wherein the controller updates the operating element's home position memorized in the controller when a difference between the operating element's home position memorized in the controller and the calculated new home position reaches a predetermined value.

4. The steer-by-wire drive control system according to claim 2, wherein the first controller updates the operating element's home position memorized in the first controller when a difference between the operating element's home position memorized in the first controller and the operated device's home position reaches a predetermined value.

* * * * *